(12) United States Patent
Dooley et al.

(10) Patent No.: US 7,253,239 B2
(45) Date of Patent: Aug. 7, 2007

(54) METHOD FOR PREVENTING OR INHIBITING FOULING IN A GAS-PHASE POLYOLEFIN POLYMERIZATION PROCESS

(75) Inventors: Kenneth Alan Dooley, Longview, TX (US); Don Kent Farrer, Longview, TX (US); Sandra Dorothy Holyfield, Longview, TX (US); Glenn Edward Moore, Longview, TX (US); Larry Allen Noble, Longview, TX (US)

(73) Assignee: Westlake Longview Corporation, Houston, TX (US)

(*) Notice: Subject to any disclaimer, the term of this patent is extended or adjusted under 35 U.S.C. 154(b) by 117 days.

(21) Appl. No.: 11/249,573

(22) Filed: Oct. 13, 2005

(65) Prior Publication Data

US 2006/0094837 A1 May 4, 2006

Related U.S. Application Data

(60) Provisional application No. 60/623,528, filed on Oct. 29, 2004.

(51) Int. Cl.
*C08F 2/34* (2006.01)

(52) U.S. Cl. .................... 526/88; 526/65; 526/74; 526/901

(58) Field of Classification Search .............. 526/74, 526/88, 65, 901
See application file for complete search history.

(56) References Cited

U.S. PATENT DOCUMENTS

| | | | |
|---|---|---|---|
| 5,028,670 A | 7/1991 | Chinh et al. | |
| 5,037,905 A * | 8/1991 | Cummings et al. | 526/74 |
| 5,082,634 A | 1/1992 | Raufastl | |
| 5,126,414 A | 6/1992 | Cooke et al. | |
| 5,213,768 A | 5/1993 | Maurel et al. | |
| 5,266,276 A | 11/1993 | Chinh et al. | |
| 5,352,749 A | 10/1994 | DeChellis et al. | |
| 5,453,471 A | 9/1995 | Bernier et al. | |
| 5,610,244 A | 3/1997 | Govoni et al. | |
| 5,625,012 A * | 4/1997 | Hussein et al. | 526/74 |
| 5,668,228 A | 9/1997 | Chinh et al. | |
| 5,834,571 A | 11/1998 | Bernier et al. | |
| 5,898,053 A | 4/1999 | Leaney et al. | |
| 6,001,938 A | 12/1999 | Chinh et al. | |
| 6,300,429 B1 | 10/2001 | Spriggs et al. | |
| 6,306,981 B1 | 10/2001 | Brown et al. | |
| 6,353,063 B1 | 3/2002 | Shimizu et al. | |
| 6,472,482 B1 | 10/2002 | Evertz et al. | |

FOREIGN PATENT DOCUMENTS

| | | |
|---|---|---|
| EP | 0 351 068 A | 1/1990 |
| EP | 0 496 093 A | 7/1992 |
| EP | 0 703 246 A1 | 3/1996 |
| EP | 1083192 A | 3/2001 |
| WO | WO 00/58374 A | 10/2000 |
| WO | WO 01/16191 A | 3/2001 |
| WO | WO 01/83570 A | 11/2001 |

* cited by examiner

*Primary Examiner*—Fred Teskin
(74) *Attorney, Agent, or Firm*—Buchanan Ingersoll & Rooney PC

(57) ABSTRACT

A method for preventing or inhibiting fouling in a gas-phase polyolefin polymerization process. The method includes maintaining the inside surface temperature of the process equipment below the dew point temperature of the gas mixture passing through the equipment.

11 Claims, No Drawings

METHOD FOR PREVENTING OR INHIBITING FOULING IN A GAS-PHASE POLYOLEFIN POLYMERIZATION PROCESS

CROSS-REFERENCE TO RELATED APPLICATIONS

This application claims the benefit of U.S. Provisional Patent Application No. 60/623,528, filed on Oct. 29, 2004; the entire content of which is hereby incorporated by reference.

FIELD OF THE INVENTION

The present invention generally relates to a method for preventing or inhibiting fouling in a gas-phase polyolefin polymerization process.

BACKGROUND OF THE INVENTION

In a continuous gas-phase, fluidized-bed polyolefin polymerization process, it was found that process equipment such as the gas loop piping and heat exchangers would foul to such an extent that a shutdown was periodically required to clean the equipment. Investigation into this problem led to the surprising discovery that internal equipment surfaces that were made to "sweat" (i.e., condense liquids on the internal surfaces) and kept wet had a reduced tendency to foul and remained clean for long periods of time. Modification of equipment and/or operating conditions such that the surfaces of the equipment that are exposed to the process gas could be made to "sweat" or condense liquids on all or nearly all of their surfaces has greatly reduced the rate of fouling experienced in the loop and the loop heat exchangers. In addition, "sweating" of the internal pipe surfaces of a tubular, loop, gas-phase polymerization reactor greatly reduces the fouling rate experienced in the reactor.

SUMMARY OF THE INVENTION

The invention provides for a method for preventing or inhibiting fouling in a gas-phase polyolefin polymerization process. In one embodiment, the method comprises passing a gas mixture having an average temperature above its dew point temperature through process equipment, and maintaining the inside surface temperature of the equipment below the dew point temperature of the gas mixture.

In another embodiment, the method comprises diverting at least a portion of a gas mixture flowing through equipment in the polymerization process through a by-pass around the equipment, maintaining the inside surface temperature of the equipment below the dew point temperature of the gas mixture, and combining the portion of the gas mixture flowing through the by-pass with the portion of the gas mixture flowing through the equipment to form a combined gas mixture having an average temperature above the combined gas mixture's dew point temperature.

DETAILED DESCRIPTION OF THE INVENTION

The method of the invention can be applied to any gas-phase polyolefin polymerization process that is susceptible to fouling. Such processes include those using gas-phase tubular loop reactors or fluidized bed reactors.

In a first embodiment, the method of the invention comprises passing a gas mixture having an average temperature above its dew point temperature through process equipment, and maintaining the inside surface temperature of the equipment below the dew point temperature of the gas mixture.

The gas mixture typically contains olefin monomers, hydrogen, nitrogen, and optionally one or more inert condensable compounds. Typical olefin monomers include one or more of ethylene, propylene, 1-butene, 1-pentene, 1-hexene, 1-heptene, 1-octene, 1-dodecene, etc. Exemplary inert condensable compounds include saturated hydrocarbons such as butane, pentane, hexane, or mixtures thereof.

The process equipment includes piping, heat exchangers, cyclone separators, gas ejectors, compressors, reactors, or combinations thereof.

At any specific location along the path of a flowing gas mixture that is in a specific piece of process equipment, there can be temperature gradients in the gas mixture at that specific location such that the temperature of the gas mixture at the wall of the equipment at that location may be different than the temperature of the gas mixture at the middle of the equipment at that location. The term "average temperature" is meant to refer to the temperature that the gas mixture at a location would be if it were blended such that there was no longer a temperature gradient at that location. The phrase "average temperature above its dew point temperature through process equipment" is meant to imply that the "average temperature" at any location along the flow path of the gas mixture in the equipment is above the dew point temperature of the gas mixture. The "average temperature" as applied to a piece of process equipment or piping, is not meant to refer to the average of all the gas temperatures throughout the particular piece of equipment or piping.

The maintaining step in the method of the invention may be carried out in a number of ways. For example, it may be accomplished by adding an inert condensable compound to the gas mixture. Alternatively or in addition to adding an inert condensable compound, the maintaining step can be accomplished by decreasing the velocity of the gas mixture flowing through the process equipment. The maintaining step could also be achieved wholly or partly by cooling the external surface of the process equipment such that the internal surface temperature is below the dew point temperature of the gas mixture. The objective of the maintaining step is to induce wetting or condensation on the inside surface of the process equipment that is susceptible to fouling. It has been surprisingly found that such surface wetting can prevent or inhibit fouling in the process equipment.

In second embodiment, the method of the invention comprises diverting at least a portion of a gas mixture flowing through equipment in the polymerization process through a by-pass around the equipment, maintaining the inside surface temperature of the equipment below the dew point temperature of the gas mixture, and combining the portion of the gas mixture flowing through the by-pass with the portion of the gas mixture flowing through the equipment to form a combined gas mixture having an average temperature above the combined gas mixture's dew point temperature.

Diverting at least a portion of the gas mixture flowing through a piece of process equipment has the effect of reducing the velocity of the gas mixture, thereby inducing condensation and preventing or inhibiting fouling inside the process equipment. This embodiment is particularly suitable to preventing or inhibiting fouling inside of heat exchangers used in the polymerization process.

This invention can be further illustrated by the following examples of preferred embodiments thereof, although it will be understood that these examples are included merely for purposes of illustration and are not intended to limit the scope of the invention. Unless otherwise indicated, all weight percentages are based on the total weight of the polymer composition and all molecular weights are weight average molecular weights. Also, all percentages are by weight unless otherwise indicated.

EXAMPLES

The transition metal component of the Ziegler-Natta catalyst used in Examples 1-8 herein was prepared in accordance with Example 1-a of European Patent Application EP 0 703 246 A1, which is herein incorporated by reference. The Ziegler-Natta catalyst was used in prepolymer form, and was prepared in accordance with Example 1-b of European Patent Application EP 0 703 246 A1.

In Examples 1-8 below, a prepolymer containing about 35.7 grams of polyethylene per millimole of titanium, with a tri-n-octylaluminum (TnOA) to titanium molar ratio of about 1.0, was obtained.

The continuous, gas-phase polymerization process utilized in Examples 1-8 herein was carried out in a fluidized-bed reactor for gas-phase polymerization, which included a vertical cylinder of diameter 5 meters and height 16 meters and surmounted by a velocity reduction chamber. The reactor was provided in its lower part with a fluidization grid and with an external line for recycling gas, which connects the top of the velocity reduction chamber to the lower part of the reactor, at a point below the fluidization grid. The recycling line was equipped with a compressor for circulating gas and two heat exchangers. One of the heat exchangers provided cooling to the suction of the compressor and will be referred to as the suction cooler. The second heat exchanger was located downstream of the compressor and will be referred to as the aftercooler. In both exchangers, the process gas was passed through the tube side of the shell-and-tube exchangers. Both exchangers were positioned vertically such that the process gas passed downward through the tubes. Cool water was passed upwards through the shell of both exchangers as the cooling medium. The lines for supplying ethylene, 1-hexene, hydrogen and nitrogen, which represent the main constituents of the gaseous reaction mixture passing through the fluidized bed, feed into the recycling line. After the compressor and the aftercooler, the gas recycling line was divided into two separate lines that were then used to introduce the recycling gas beneath the fluidization grid at two points directly opposite one another. The arrangement of the reactor entries for the recycling gas and the design of the gas mixing chamber below the fluidization grid are described in U.S. Pat. No. 5,213,768; the content of which is herein incorporated by reference.

The fluidization grid is designed to distribute the fluidization gas approximately evenly across the diameter of the fluidized-bed reactor. The design of the fluidization grid is described in U.S. Pat. No. 5,082,634, which is herein incorporated by reference. Such a fluidization grid is a device provided with apertures and the gas stream introduced beneath the grid has to be distributed evenly through these apertures.

Above the fluidization grid, the reactor contained a fluidized bed ranging from about 80,000 kilograms to 100,000 kilograms of a linear low-density polyethylene powder made up of particles with a weight-average diameter of about 0.7 mm. The gaseous reaction mixture, which contained ethylene, 1-hexene, hydrogen, nitrogen and minor amounts of other components, passed through the fluidized bed under a pressure ranging from about 290 psig (2.0 Mpa) to about 305 psig (2.2 MPa) with an ascending fluidization speed of between about 1.7 feet per second (52 cm per second) and about 1.95 feet per second (59 cm per second). Polymer product was removed intermittently from the reactor.

In Examples 1-8, a catalyst was introduced intermittently into the reactor, the catalyst comprising magnesium, chlorine, and titanium and having been converted beforehand to a prepolymer, as described above, containing about 35.7 grams of polyethylene per millimole of titanium and an amount of tri-n-octylaluminum (TnOA) such that the molar ratio, Al/Ti, was equal to about 1.0. The rate of introduction of the prepolymer into the reactor was adjusted to achieve the desired production rate. During the polymerization, a solution of trimethylaluminum (TMA) in n-hexane, at a concentration of about 45 weight percent, was introduced continuously into the line for recycling the gaseous reaction mixture, at a point situated downstream of the aftercooler. The feed rate of TMA is expressed as a molar ratio of TMA to titanium (TMA/Ti), and is defined as the ratio of the TMA feed rate (in moles of TMA per hour) to the prepolymer feed rate (in moles of titanium per hour). Simultaneously, a solution of tetrahydrofuran (THF) in n-hexane, at a concentration of between 10 and 50 weight percent, was introduced continuously into the line for recycling the gaseous reaction mixture. The feed rate of THF is expressed as a molar ratio of THF to titanium (THF/Ti), and is defined as the ratio of the THF feed rate (in moles of THF per hour) to the prepolymer feed rate (in moles of titanium per hour). Dinitrogen monoxide ($N_2O$) was added as a gas to the line for recycling the gaseous reaction mixture. The concentration of $N_2O$ in the gas phase polymerization medium is expressed in units of parts per million (ppm) by volume.

In Examples 1-8, a solution of chloroform ($CHCl_3$) in n-hexane, at a concentration of between 2 and 30 weight percent, was introduced continuously into the line for recycling the gaseous reaction mixture. The feed rate of $CHCl_3$ is expressed as a molar ratio of $CHCl_3$ to titanium ($CHCl_3$/Ti), and is defined as the ratio of the $CHCl_3$ feed rate (in moles of $CHCl_3$ per hour) to the prepolymer feed rate (in moles of titanium per hour). The $CHCl_3$ was added as a solution in n-hexane to the line for recycling the gaseous reaction mixture.

Examples 1-4 (Comparative)

The continuous, gas-phase polymerization process was operated for different periods of time as specified in Table 1. During these various periods of time, the suction cooler was operated such that the gas provided to the compressor was always above the dew point of the gas. In order to keep the gas mixture above its dew point, the temperature of the cooling medium used in the suction cooler was kept above the dew point temperature of the gas mixture. Therefore, the internal surfaces of the suction cooler would never be "sweating". During these times, the differential pressure drop (dP) across the suction cooler increased as noted in Table 1, indicating average fouling rates that are also provided in Table 1. At the end of each of the individual time periods listed in Table 1, the pressure drop in the suction cooler was sufficient to seriously limit the fluidization velocity in the reactor and the reactor had to be shut down to clean the suction cooler. The shutdowns typically required the reactor to be out of service for 7 to 10 days. Inspection of the suction cooler before each cleaning indicated that the tubes had fouled with polymer over their entire length.

TABLE 1

| Example Number | Approximate Run Period (Days) | Starting Suction Cooler dP (psi) | Ending Suction Cooler dP (psi) | Increase in dP during time period (psi) | Avg Rate of Increase in dP of Suction Cooler (psi/100 days) |
| --- | --- | --- | --- | --- | --- |
| 1 | 195 | 3 to 4 | 11 | 7 to 8 | 3.5 to 4.1 |
| 2 | 335 | 4 to 6 | 14 | 8 to 10 | 2.4 to 3 |
| 3 | 80 | 6 to 8 | 15 to 16 | 7 to 10 | 8.8 to 12.5 |
| 4 | 80 | 5 to 7 | 21 to 22 | 14 to 17 | 17.5 to 21.3 |

Example 5

A modification was made to the suction cooler such that a portion of the gas to be cooled could be bypassed. A control valve was installed to allow the amount of gas being bypassed to be controlled. The temperature of the recombined stream (the stream formed when the cooled stream and cooler bypass stream were recombined) was controlled above the dew point temperature of the gas mixture by controlling how much gas bypassed the suction cooler. The low velocity of the gas through the suction cooler allowed for "sweating" or condensation to occur within a few inches of the inlet tube-sheet and continue "sweating" the entire length of the tube-sheet. In fact, the temperature of the gas being discharged from the suction cooler was allowed to operate below the dew-point temperature of the gas even though the recombined stream was operating above the dew point. After operating about 400 days in this manner, the exchanger was inspected and found to be only mildly fouled in the top 1 to 2 feet of the exchanger. The differential pressure drop (dP) across the suction cooler did not increase during the 400 days, as noted in Table 2.

TABLE 2

| Example Number | Approximate Run Period (Days) | Starting Suction Cooler dP (psi) | Ending Suction Cooler dP (psi) | Increase in dP during time period (psi) | Avg Rate of Increase in dP of Suction Cooler (psi/100 days) |
| --- | --- | --- | --- | --- | --- |
| 5 | 400 | 3.0 | 3.0 | 0 | 0 |

Examples 6-7 (Comparative)

The continuous, gas-phase polymerization process was operated for different periods of time as specified in Table 3. During these various periods of time, the aftercooler was operated with an inlet temperature that was 15 to 20° C. above the dewpoint temperature of the gas mixture, such that "sweating" did not occur within the first 8 to 10 feet of the discharge cooler. During these times periods, the differential pressure drop (dP) across the discharge cooler increased as noted in Table 3, indicating average fouling rates that are also provided in Table 3.

At the end of each of the individual time periods listed in Table 3, the pressure drop in the discharge cooler was sufficient to be seriously limiting the fluidization velocity in the reactor and the reactor had to be shut down to clean the discharge cooler. The shut downs typically required the reactor to be out of service for 7 to 10 days. Inspection of the discharge cooler before each cleaning indicated that the discharge cooler tubes had fouled over the first 8 to 10 feet from the inlet tube-sheet.

TABLE 3

| Example Number | Approximate Run Period (Days) | Starting Discharge Cooler dP (psi) | Ending Discharge Cooler dP (psi) | Increase in dP during time period (psi) | Avg Rate of increase in dP of Discharge Cooler (psi/100 days) |
| --- | --- | --- | --- | --- | --- |
| 6 | 365 | 1 to 2 | 7 to 8 | 5 to 7 | 1.4 to 1.9 |
| 7 | 230 | 1 to 2 | 16 to 17 | 14 to 16 | 6.1 to 7.0 |

Example 8

The continuous, gas-phase polymerization process was operated for a period of about 300 days. During the majority of this 300-day period, the discharge cooler was operated with an inlet temperature that was only 5 to 10° C. above the dewpoint temperature of the gas mixture, such that condensation in the tubes of the exchanger occurred within the first few inches. During this time, the differential pressure drop (dP) across the discharge cooler had increased from about 0.75 psi to about 1.5 psi, indicating an average fouling rate of approximately 0.25 psi/100 days. At the end of the 300-day period, the plant was shut down for scheduled maintenance and the discharge cooler was inspected. Inspection of the discharge cooler before cleaning indicated that the tubes had fouled only mildly with polymer over the top 1 to 2 feet.

The invention has been described in detail with particular reference to preferred embodiments thereof, but it will be understood that variations and modifications can be effected within the spirit and scope of the invention.

We claim:

1. A method for preventing or inhibiting fouling in a gas-phase polyolefin polymerization process, comprising:
   passing a gas mixture having an average temperature above its dew point temperature through process equipment; and
   maintaining the inside surface temperature of the equipment below the dew point temperature of the gas mixture.

2. The method according to claim 1, wherein the maintaining step comprises adding an inert condensable compound to the gas mixture.

3. The method according to claim 2, wherein the inert condensable compound is a saturated hydrocarbon.

4. The method according to claim 3, wherein the saturated hydrocarbon comprises butane, pentane, hexane, or mixtures thereof.

5. The method according to claim 1, wherein the maintaining step comprises decreasing the velocity of the gas mixture flowing through the equipment.

6. The method according to claim 1, wherein the process equipment comprises piping, heat exchangers, cyclone separators, gas ejectors, compressors, reactors, or combinations thereof.

7. A method for preventing or inhibiting fouling in a gas-phase polyolefin polymerization process, comprising:
   diverting at least a portion of a gas mixture flowing through equipment in the polymerization process through a by-pass around the equipment;
   maintaining the inside surface temperature of the equipment below the dew point temperature of the gas mixture; and
   combining the portion of the gas mixture flowing through the by-pass with the portion of the gas mixture flowing through the equipment to form a combined gas mixture having an average temperature above the combined gas mixture's dew point temperature.

8. The method according to claim 7, wherein the maintaining step comprises adding an inert condensable compound to the gas mixture.

9. The method according to claim 8, wherein the inert condensable compound is a saturated hydrocarbon.

10. The method according to claim 9, wherein the saturated hydrocarbon comprises butane, pentane, hexane, or mixtures thereof.

11. The method according to claim 7, wherein the process equipment comprises heat exchangers.

* * * * *